J. HOWARD.
Hoe.

No. { 973, 31,977. }

Patented Apr. 9, 1861.

Witnesses:

Inventor:
Jonathan Howard

UNITED STATES PATENT OFFICE.

JONATHAN HOWARD, OF WEST BRIDGEWATER, MASSACHUSETTS.

IMPROVED GARDEN-HOE.

Specification forming part of Letters Patent No. 31,977, dated April 9, 1861.

*To all whom it may concern:*

Be it known that I, JONATHAN HOWARD, of West Bridgewater, in the county of Plymouth and State of Massachusetts, have invented a new and useful or Improved Weeding-Hoe; and I do hereby declare the same to be fully described in the following specification and illustrated in the accompanying drawings, of which—

Figure 1:
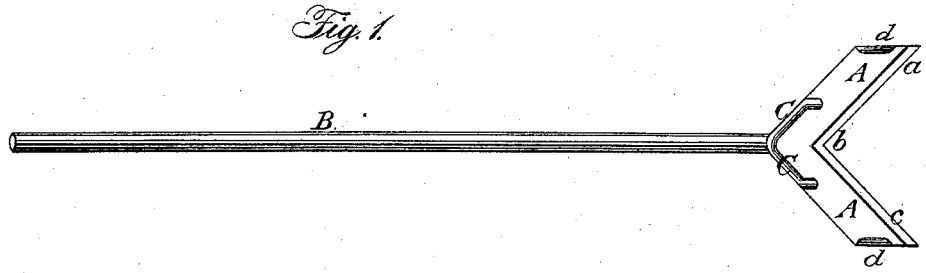
Figure 2:
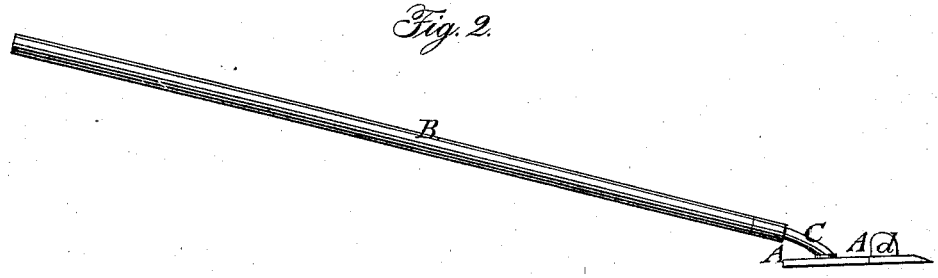

Figure 1 is a top view, and Fig. 2 a side elevation, of it.

In such drawings, A denotes the blade, and B the handle, of such hoe, the two being arranged in manner, and connected by a forked shank or prongs, as shown at C C. By this arrangement the salient angle of the rear edges of the hoe-blade, as well as the re-entering angle of the front edges of each blade, may be used for the purposes of hoeing or weeding, as the connection of the blade with the handle by means of the forked shank or prongs C C, arranged so as to project upward from and at inclinations to the blade and on sides of its middle, leaves a clear open space between the blade and the handle.

I do not claim a hoe made with re-entering and salient angles, and its handle fastened directly to the nose or front of the salient angle; nor do I claim a hoe made with a salient angular lower end, and provided with a guide extending upward from one or each edge of the blade, for with my hoe I use two of such guides—viz., those marked $d\ d$—and arrange and combine them with both salient and re-entering edges of the blade, (formed as shown in Fig. 1,) and I so arrange and combine with such blade and such guides a handle as to enable the hoe to be used for weeding, either by pushing it forward or by drawing it backward, and with either of its guides close to a row of plants. Thus with my hoe a person can weed both forward and backward over the whole space between any two adjacent rows of plants while passing along once between such rows, whereas with either of the other kinds of hoe, as above referred to, he would be obliged to go through the space first in one direction and next return in the opposite direction in order to accomplish the weeding.

Thus it will be seen that over the others, as above referred to, my improved hoe, made as described, is a great improvement, and therefore—

The blade, as exhibited in the drawings, is constructed with two cutting-edges, $a\ b\ b\ c$, arranged on the two shorter sides of a triangular notch or opening, $a\ b\ c$, the rear of the blade being parallel with the said two edges $a\ b\ b\ c$. At the two opposite sides of the blade two projections or guides, $d\ d$, are arranged, as shown in the figures. Each is a thin plate of metal elevated perpendicularly on the blade.

This hoe is intended to be used between two rows of plants, and for the purpose of cutting off the roots of weeds and otherwise extirpating such weeds when they may have grown between the plants of such two rows. To accomplish this the hoe is to be pushed along under the surface of the ground between the rows, one of the guides $d$—viz., that which is nearest to one row of the plants—serving not only to indicate the position of the blade with respect to such row, but to separate the soil near to the row in order that it may be broken up without disturbing that which is in close contiguity with the row and ought not to be disturbed. By having the two guides arranged on the hoe-blade, as described and represented, a person while using the hoe can first operate toward one and next toward the other of the two rows.

If desirable, the rear edges of the hoe-blade may be made sharp, so as to cut roots when the hoe is being drawn backward.

A hoe so made I have found to be an excellent garden implement, or one possessing great utility for the purpose for which it is intended.

I claim—

The said weeding-hoe, as constructed, with the guides $d\ d$ and the handle B, arranged and combined with the peculiar salient and re-entering angular blade A, essentially in the manner and for the purpose as specified.

JONATHAN HOWARD.

Witnesses:
R. H. EDDY,
F. P. HALE, Jr.